United States Patent [19]

Maeda

[11] Patent Number: 5,729,006
[45] Date of Patent: Mar. 17, 1998

[54] REEL ROTATION DETECTING DEVICE IN A VIDEO CASSETTE RECORDER

[75] Inventor: Osamu Maeda, Daito, Japan

[73] Assignee: Funai Electric Co., Ltd., Osaka, Japan

[21] Appl. No.: 827,531

[22] Filed: Mar. 28, 1997

Related U.S. Application Data

[63] Continuation of Ser. No. 511,464, Aug. 4, 1995, abandoned.

[30] Foreign Application Priority Data

Aug. 5, 1994 [JP] Japan ................. 6-009657 U

[51] Int. Cl.$^6$ ............................................. G01D 5/34
[52] U.S. Cl. ................. 250/231.13; 250/227.28; 369/44.23
[58] Field of Search ........... 250/231.13, 231.18, 250/227.21, 227.28, 227.29, 227.3, 214 PR, 227.11; 360/137, 85, 74.6; 369/44.23, 44.38, 32

[56] References Cited

U.S. PATENT DOCUMENTS

| | | |
|---|---|---|
| 4,534,651 | 8/1985 | Minikane ................. 250/227.11 |
| 4,769,537 | 9/1988 | Taillebois et al. ................. 250/231.13 |
| 5,058,893 | 10/1991 | Dickinson et al. ................. 273/143 R |
| 5,389,777 | 2/1995 | Chin ................. 250/227.21 |

FOREIGN PATENT DOCUMENTS

| | | |
|---|---|---|
| 2-282958 | 11/1990 | Japan. |
| 5-59622 | 8/1993 | Japan. |

*Primary Examiner*—Que Le
*Attorney, Agent, or Firm*—Bacon & Thomas

[57] ABSTRACT

A reel sensor for detecting the number of rotations or the rotation condition of a tape winding reel employed in a video cassette recorder, for example. The reel sensor includes a light conductive element formed of a light transmissible material and including a base portion mountable on a printed circuit board and a pair of light conductive portions respectively erected on the base portion. Further, two element storage pockets are formed separately in the base portion in such a manner that they respectively correspond to the two light conductive portions, and two reflecting surfaces are formed respectively in the end portions of the two light conductive portions for reflecting and entering the light passing through one of the two light conductive portions into the other light conductive portion. Furthermore, a light shield member for shielding the light between the two element storage pockets is disposed in the base portion.

17 Claims, 5 Drawing Sheets

REEL ROTATION DETECTING DEVICE IN A VIDEO CASSETTE RECORDER

This application is a Continuation of application Ser. No. 08/511,464, filed Aug. 4, 1995, now abandoned.

BACKGROUND OF THE INVENTION

1. Field of the Invention

The present invention relates to a reel sensor and, in particular, to a reel sensor which is mounted on a printed circuit board and includes an optical path adapted to cross the rotation loci of reel sensing projections in order to detect the number of rotations or the rotation condition of a tape winding reel employed in a video cassette recorder (VCR), a video cassette player (VCP), an audio cassette recorder, a digital cassette recorder, and the like.

2. Description of the Related Art

In FIG. 10, conventionally, a reel sensor 40, which is used to detect the number of rotations of a tape winding reel 47 provided in a VCR which is one of electric appliances and also to detect the rotation condition of the tape winding reel 47, that is, whether the reel 47 is rotating or not, is disposed under a deck chassis 41 provided within a chassis case (not shown) of a VCR main body. The chassis case has a function as a light shield plate to shield the light coming from the outside. On the deck chassis 41, besides the tape winding reel 47, there are placed VCR drive mechanism elements such as a rotary drum (not shown), a tape loading arm (not shown) and the like. The reel sensor 40 is provided on a printed circuit board (PCB) 43 disposed under the deck chassis 41, and is set at such a position that a plurality of projections 45 spaced at predetermined distances on the back surface of the reel 47 are able to cross a photointerrupter 44 by means of leads 42. The leads 42 are soldered to the printed circuit board 43. The photointerrupter 44 includes therein a light emitting diode (infrared LED) or a light emitting element which emits infrared rays, and a phototransistor or a light receiving element to which an infrared filter is applied to permit only the infrared rays to pass therethrough. When the projection 45 crosses between the infrared LED and the phototransistor with the infrared filter applied thereto, the infrared rays are shielded. By detecting the light receiving condition of the phototransistor, it is possible to detect the rotation condition of the reel 47, that is, whether the reel 47 is rotating or not, and the number of rotations of the reel 47 (see Japanese Utility Model Unexamined Publication No. Hei. 5-59622).

However, there are still left some problems to be solved in the conventional tape reel sensor 40. That is, since the reel sensor 40 requires parts respectively having the long leads 42, not only the parts are difficult to manufacture and are thus increased in costs, but also the productivity thereof is lowered when they are assembled.

SUMMARY OF THE INVENTION

In order to eliminate the drawbacks found in the above-mentioned conventional reel sensor, it is an object of the invention to provide a reel sensor capable of obtaining the component elements easily and lowering the manufacturing cost, to improve the productivity thereof.

In order to attain the above object, the invention provides a reel sensor mounted on a printed circuit board and having an optical path which crosses rotation loci of sensing projections of a reel, the reel sensor including: a light conductive element formed of a light transmissible material and including a base portion to be mounted on the printed circuit board and a pair of light conductive portions respectively erected on the base portion; two element storage pockets separately formed in the base portion in such a manner that they respectively correspond to the light conductive portions; a light emitting element stored in one of the two element storage pockets for emitting light; a light receiving element stored in the other of the two element storage pockets for receiving the light; two reflecting surfaces respectively formed in end portions of the light conductive portions for reflecting and entering the light passing through one of the light conductive portions into the other of the light conductive portions; and light shield means for shielding the light between the two element storage pockets formed in the base portion.

Further, the invention provides a reel sensor mounted on a printed circuit board and including an optical path which crosses rotation loci of sensing projections of a reel, the reel sensor including: a light conductive element formed of a light intransmissible material and including a base portion to be mounted on the printed circuit board and a pair of light conductive tubes respectively erected on the base portion; two element storage pockets separately formed in the base portion in such a manner that they are separately in communication with the light conductive tubes; a light emitting element stored in one of the two element storage pockets for emitting light; a light receiving element stored in the other of the two element storage pockets for receiving the light; and two reflecting mirrors respectively formed in end portions of the light conductive tubes for reflecting and entering the light passing through one of the light conductive tubes into the other of the light conductive tubes.

Furthermore, the invention provides a reel sensor mounted on a printed circuit board and including an optical path which crosses rotation loci of sensing projections of a reel, the reel sensor including: a light conductive element including a base portion formed of a light intransmissible material and to be mounted on the printed circuit board and a pair of light conductive portions respectively formed of a light transmissible material and erected on the base portion; two element storage pockets separately formed in the base portion in such a manner that they respectively correspond to the light conductive portions; a light emitting element stored in one of the two element storage pockets for emitting light; a light receiving element stored in the other of the two element storage pockets for receiving the light; and two reflecting surfaces respectively formed in end portions of the light conductive portions for reflecting and entering the light passing through one of the light conductive portions into the other of the light conductive portions.

DETAILED DESCRIPTION OF THE PREFERRED EMBODIMENTS

Now, description will be given below of the embodiments of the reel sensor according to the invention with reference to the accompanying drawings.

Figure 1:
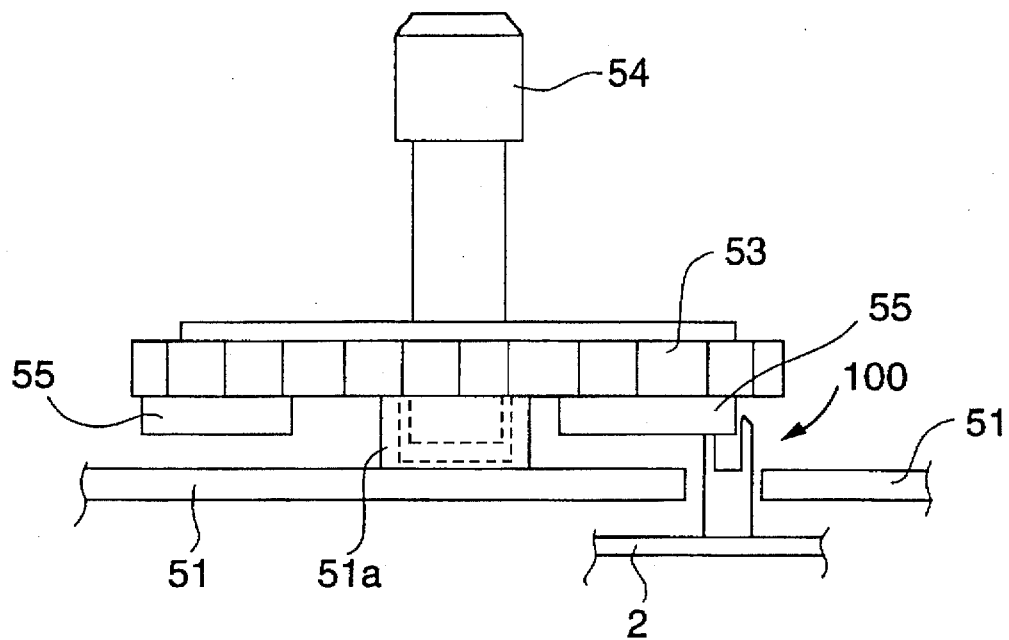
FIG. 1 is a front view showing the main portions of a video cassette recorder incorporating therein a first embodiment of a reel sensor according to the invention.
Figure 2:
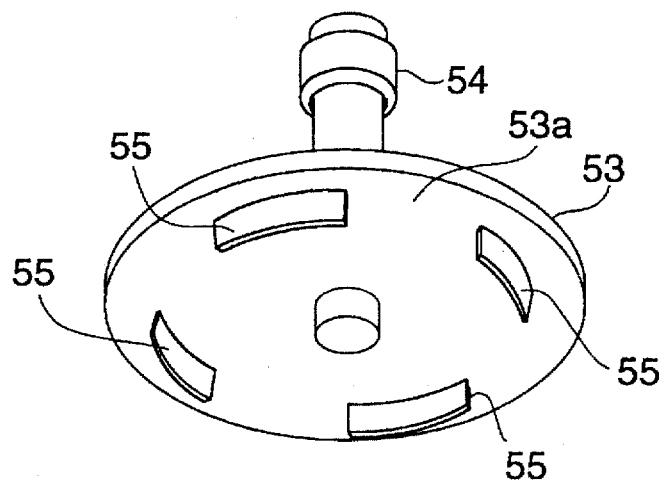
FIG. 2 is a perspective view showing the lower surface of a reel of the reel sensor shown in FIG. 1.
Figure 3:
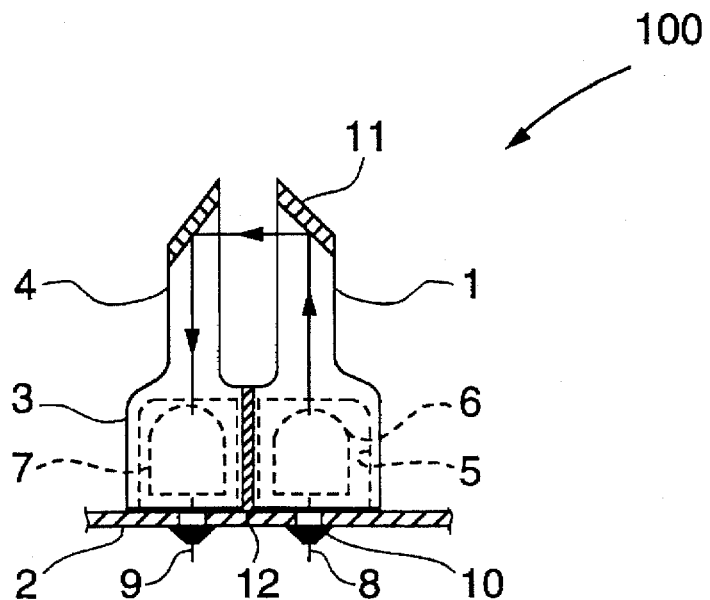
FIG. 3 is a side view showing the reel sensor according to the first embodiment shown in FIG. 1.

In particular, FIGS. 1 to 3 respectively show a first embodiment of the reel sensor according to the invention.

At first, description will be given of the structure of the present reel sensor.

In FIGS. 1 and 2, reference character 100 designates a reel sensor which is mounted on a printed circuit board 2. A reel 54 having a disk-like rotary plate 53, on which a tape holder (not shown) is to be placed, is rotatably supported on a support portion 51a of a deck chassis 51. Four downwardly projecting arc-shaped sensing projections 55 are provided in a peripheral portion 53a on the lower surface side of the rotary plate 53 and along the circumferential direction of the peripheral portion 53a in such a manner that the sensing projections 55 are spaced from one another and shield the optical path of the reel sensor 100.

When the reel 54 is rotated, a tape is supplied from or taken up around the tape holder on the reel and the rotation loci of the sensing projections 55 on the lower surface of the rotary plate 53 of the reel 54 cross the optical path of the reel sensor 100 to thereby shield the optical path intermittently, so that the reel sensor 100 sends a signal corresponding to the rotation speed of the reel 54 to a rotation control unit (not shown).

The reel sensor 100, as shown in FIG. 3, includes a light conductive element 1 which is formed of a light transmissible material including a plastic (synthetic resin) material such as acryl, polycarbonate or the like and other kinds of material. The light conductive element 1 includes a base portion 3 to be mounted on the printed circuit board 2, and a pair of light conductive portions 4 respectively erected on the base portion 3 and spaced properly apart from each other so as to allow the reel sensing projections (which are not shown in FIG. 3) to pass between them. In the base portion 3, there are separately formed two element storage pockets 5 in such a manner that they respectively correspond to the two light conductive portions 4 and are respectively opened downwardly. In one of the two element storage pockets 5, there is stored a light emitting element 6 such as a visible light emitting diode (LED) or the like and, in the other pocket 5, there is stored a light receiving element 7 such as a phototransistor or the like to which an infrared filter is not applied. These elements 6 and 7 respectively have short leads 8 and 9 which respectively extend through the printed circuit board 2. The lower ends of the leads 8 and 9 are soldered to the printed circuit board 2 by a solder 10, whereby the light conductive element 1 is mounted onto the printed circuit board 2.

On the other hand, in the respective end portions of the two light conductive portions 4, there are formed reflecting surfaces 11 by machining such as mirror grinding or the like in such a manner that the outer surfaces thereof are inclined at an angle of 45°. These reflecting surfaces 11, as shown by arrows in FIG. 3, are used to reflect and enter the light emitted from the light emitting element 6 and passing through one of the light conductive portions 4 into the other light conductive portion 4, while the light passing through the other light conductive portion 4 is received by the light receiving element 7.

Further, in the middle portion of the base portion 3, in order to prevent the light emitted from the light emitting element 6 from moving directly to the light receiving element 7, there is provided a light shield member 12 formed of a metal or the like, as light shield means. The light shield member 12 is inserted between the two divided sections of the light conductive element 1 when they are assembled together.

Next, description will be given below of the operation of the reel sensor structured in the above-mentioned manner.

According to the invention, since the light emitting element 6 for emitting the visible rays and the light receiving element 7 for receiving the visible rays respectively have the short leads 8 and 9, not only ordinary elements can be used and thus the elements are easy to obtain and are inexpensive, but also there is eliminated the need for provision of an infrared filter in the light receiving element, which can reduce the number of parts. Further, the elements can be mounted onto the printed circuit board 2 quite easily and the recognition of the optical path from the light emitting element 6 to the light receiving element 7 can be achieved easily. As a result of this, the assembling productivity of the reel sensor can be improved greatly.

Figure 4:
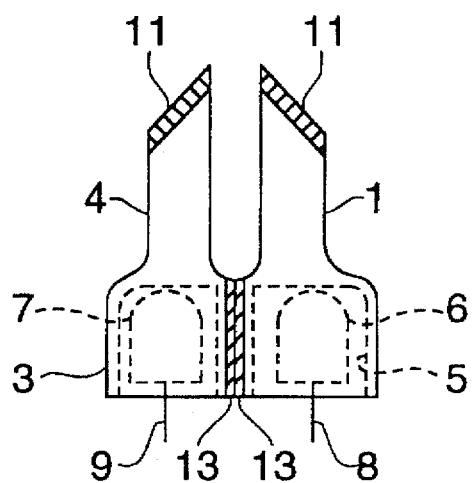
FIG. 4 is a side view showing another example of the main portions of the reel sensor shown in FIG. 1.
Figure 5:
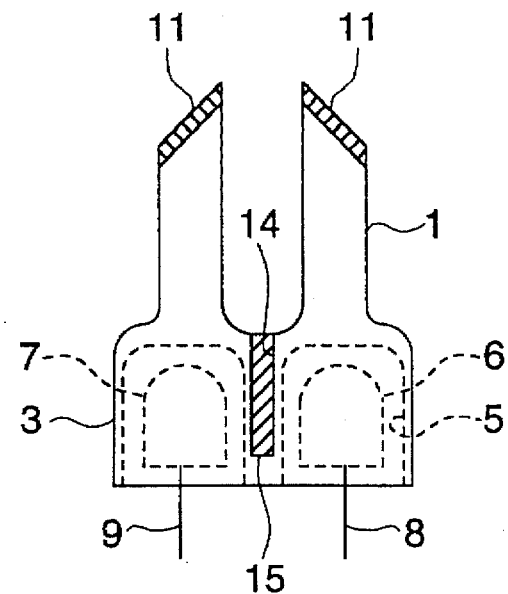
FIG. 5 is a side view showing still another example of the main portions of the reel sensor shown in FIG. 1.
Figure 6:
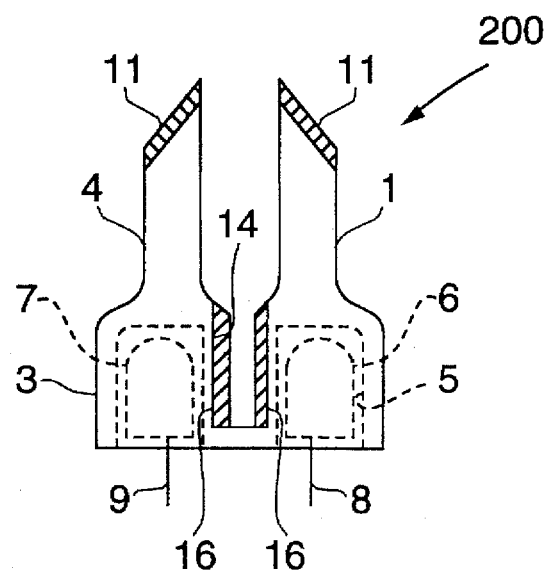
FIG. 6 is a side view showing yet another example of the main portions of the reel sensor shown in FIG. 1.
Figure 7:
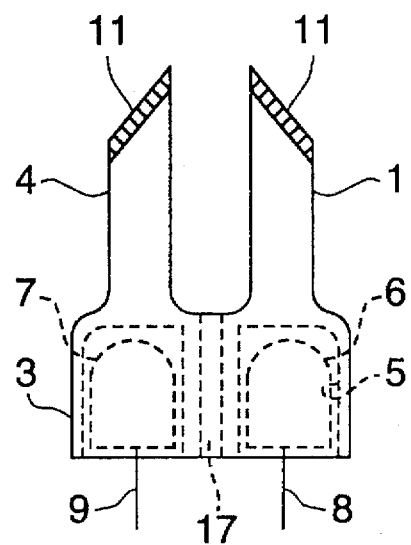
FIG. 7 is a side view showing a further example of the main portions of the reel sensor shown in FIG. 1.

Here, in the above description, the light shield means is provided by inserting the light shield member 12 between the two right and left divided sections of the light conductive element 1. However, the invention is not limited to this but the light shield means may be provided in other manners. For example, as shown in FIG. 4, the light shield means may be provided by forming, by machining, two reflecting surfaces 13 on the connecting surfaces of the base portions 3 of the two right and left divided sections of the light conductive element 1; or, as shown in FIG. 5, the base portion 3 of the light conductive element 1 may be cut in the middle portion thereof to thereby produce a cut portion 14, and a light shield member 15 may be inserted into the cut portion 14; or, as shown in FIG. 6, two reflecting surfaces 16 may be formed by machining the mutually opposing outer surfaces of the cut portion 14; or, as shown in FIG. 7, when the light conductive element 1 is formed, a light shield member 17 may be insert-molded in such a manner that it is positioned in the middle of the base portion 3.

Figure 8:
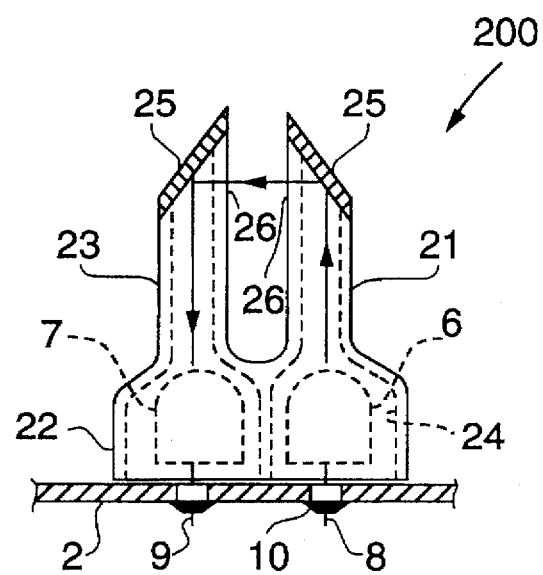
FIG. 8 is a side view showing a second embodiment of the reel sensor according to the invention.

Now, in FIG. 8, there is shown a side view of a reel sensor 200 according to a second embodiment of the invention.

The reel sensor 200 includes a light conductive element 21 which is formed of a light intransmissible material such as a metal material. The light conductive element 21 includes a base portion 22 to be mounted on a printed circuit board 2, and a pair of light conductive tubes 23 respectively erected on the base portion 22 and spaced properly from each other, while the base portion 22 and light conductive tubes 23 are formed integrally with each other, that is, the element 21 is an integrally united body as a whole. In the base portion 22, there are formed two element storage pockets 24 respectively corresponding to the two light conductive tubes 23. Also, in the base portion 22, the two element storage pockets 24 are separately in communication with their respectively corresponding light conductive tubes 23 and are respectively opened downwardly. Further, a light emitting element 6 for emitting the visible rays is stored in one of the two element storage pockets 24, while a light receiving element for receiving the visible rays is stored in the other element storage pocket 24. Leads 8 and 9 of the respective elements 6 and 7 are soldered by a solder 10 to thereby mount the light conductive element 21 onto the printed circuit board 2.

On the other hand, the respective end portions of the two light conductive tubes 23 are cut away in such a manner that the outer portions thereof are respectively formed in an inclined surface having an angle of inclination of 45°, thereby producing cut-away portions. Two reflecting mirrors 25 formed of a metal foil, an evaporating plate or the like are respectively mounted on the cut-away portions. In the mutually opposing portions of the end portions of the light conductive tubes 23, there are formed windows 26 which allow the light to pass therethrough. That is, due to provision of the reflecting mirrors 25 and windows 26, as shown by arrows in FIG. 8, the light emitted from the light emitting element 6 and passing through one light conductive tube 23 can be received by the light receiving element 7 through the other light conductive tube 23.

In the second embodiment as well, similarly to the first embodiment, it is possible to use the light emitting element 6 having the short lead 8 and capable of emitting visible rays and the light receiving element 7 having the short lead 9 and capable of receiving the visible rays. Also, since the base portion 22 and the pair of light conductive tubes 23 are formed integrally with each other, the productivity of the present reel sensor can be improved greatly.

Figure 9:
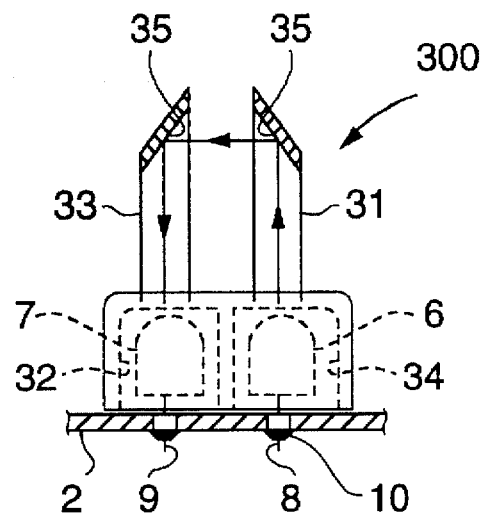
FIG. 9 is a side view showing a third embodiment of the reel sensor according to the invention.
Figure 10:
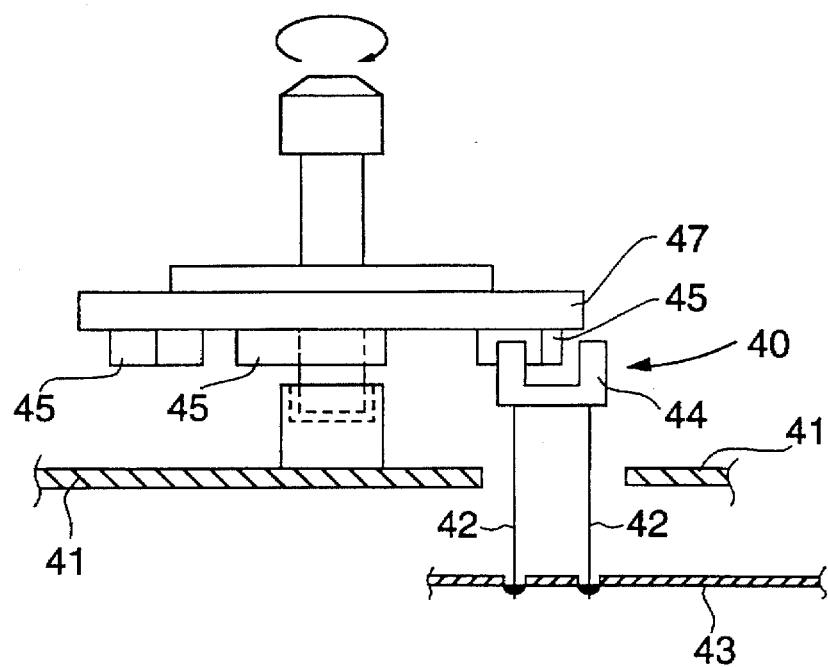
FIG. 10 is a side view showing a conventional reel sensor.

Now, in FIG. 9, there is shown a side view of a reel sensor 300 according to a third embodiment of the invention. In the third embodiment, the same parts as in the first embodiment are given the same designations.

The reel sensor 300 has a structure which is a combination of the first and second embodiments, and includes a light conductive element 31. That is, the light conductive element 31 includes a base portion 32 formed of light intransmissible material such as a metal material or the like in a manner in a light conductive tube and mountable on a printed circuit board 2, and a pair of light conductive portions 33 which are respectively formed of a light transmissible material including a plastic (synthetic resin) material such as acryl or the like and other kinds of material and are respectively erected on the base portion 32 and spaced properly from each other. In the base portion 32, there are formed two element storage pockets 34. In particular, the two element storage pockets 34 are respectively formed as two light conductive tubes, are separately situated in such a manner that they respectively correspond to the two light conductive portions 33, and are respectively opened downwardly, thereby preventing the light from moving directly from a light emitting element 6 to a light receiving element 7.

That is, in one of the two element storage pockets 34, there is stored the light emitting element 6 which emits visible rays and, in the other pocket 34, there is stored the light receiving element 7 for receiving the visible rays. Leads 8 and 9 of the respective elements 6 and 7 are soldered, whereby the light conductive element 31 is mounted onto the printed circuit board 2. On the other hand, by machining the respective end portions of the two light conductive portions 33, there are formed two reflecting surfaces 35 the outer sides of which are formed in inclined surfaces having an angle of inclination of 45°. The two reflecting surfaces 35 are used to reflect and enter the light, which is emitted from the light emitting element 6 and passes through one of the light conductive portions 33, into the other light conductive portion 33, while the light passing through the other light conductive portion 33 is received by the light receiving element 7.

In the third embodiment as well, as the light emitting and receiving elements 6 and 7, there can be used the light emitting and receiving elements that have short leads 8 and 9 and the light conductive element 31 includes the pair of light conductive portions 33 formed of a light transmissible material and the base portion 32 formed of a light intransmissible material like light conductive tubes. Therefore, the third embodiment can provide the same operation and effects as those of the first and second embodiments.

In the above-mentioned embodiments, the sensing projections 55 are provided on the lower surface of the reel 54, and the optical path of the reel sensor 100, 200 or 300 including the light emitting element 6 and light receiving element 7 is shielded by the rotation of the reel 54. However, alternatively, reflecting members may be provided on the lower surface of the reel, and the incident light coming from the light emitting element may be reflected into the light receiving element by the rotation of the reel.

The details of the above structure are well known in Japanese Patent Unexamined Publication No. Hei. 2-282958 and the like and thus the description thereof is omitted here.

As the invention is structured as in the foregoing description, there can be provided several useful effects as follows:

According to the invention, since it is possible to use the light emitting and receiving elements that respectively have short leads, there is eliminated the need for provision of a special element having a long lead, to thereby reduce the cost of the reel sensor, errors are hard to occur in mounting the light emitting and receiving elements, and the assembling productivity of the reel sensor can be improved.

Further, if the reel sensor is incorporated into an electric appliance enclosed by a light shield plate, then the light coming from the outside can be shielded and thus, even when visible rays are used, a detection error becomes hard to occur.

Furthermore, if the reel sensor is disposed under the deck chassis of an electric appliance, then the light coming from the outside can be shielded by the light shield plate and deck chassis and thus, even when visible rays are used as the light from the light emitting element, a detection error becomes hard to occur.

What is claimed is:

1. A reel sensor arranged to sense rotation of a reel in a video cassette recorder, said reel sensor being mounted on a printed circuit board in the video cassette recorder and having an optical path which crosses rotation loci of sensing projections of said reel, comprising:

a light conductive element formed of a light transmissible material and including a base portion mounted on the printed circuit board and a pair of light conductive portions respectively erected on said base portion;

two element storage pockets separately formed in said base portion in such a manner that they respectively correspond to said light conductive portions;

a light emitting element stored in one of said two element storage pockets for emitting light;

a light receiving element stored in the other of said two element storage pockets for receiving the light;

two reflecting surfaces respectively formed in end portions of said light conductive portions for causing light passing through one of said light conductive portions to be reflected into the other of said light conductive portions; and light shield means for preventing passage of light between said two element storage pockets formed in said base portion so as to prevent passage of light from said light emitting element to said light receiving element except through said light conductive element.

2. The reel sensor as set forth in claim 1, wherein said light emitting element emits visible rays, and said light receiving element receives the visible rays.

3. The reel sensor as set forth in claim 1, wherein said light shield means comprises a light shield member inserted between connecting surfaces of said base portion of two divided sections of said light conductive element.

4. The reel sensor as set forth in claim 1, wherein said light shield means comprises reflecting surfaces formed by machining connecting surfaces of said base portions of two divided sections of said light conductive element.

5. The reel sensor as set forth in claim 1, wherein said light shield means comprises a light shield member inserted into a cut portion formed by cutting a middle portion of said base portion of said light conductive element.

6. The reel sensor as set forth in claim 1, wherein said light shield means comprises reflecting surfaces formed by machining mutually opposing outer surfaces of a cut portion formed by cutting a middle portion of said base portion of said light conductive element.

7. The reel sensor as set forth in claim 1, wherein said light shield means comprises a light shield member insert-molded in a middle portion of said base portion of said light conductive element.

8. The reel sensor as set forth in claim 1, wherein said reel sensor is disposed within an electric appliance enclosed by a light shield plate.

9. The reel sensor as set forth in claim 8, wherein said reel sensor is disposed under a deck chassis of the electric appliance.

10. A reel sensor arranged to sense rotation of a reel in a video cassette recorder, said reel sensor being mounted on a printed circuit board in the video cassette recorder and including an optical path which crosses rotation loci of sensing projections of said reel, comprising:

a light conductive element formed of a light intransmissible material and including a base portion mounted on the printed circuit board and a pair of light conductive tubes respectively erected on said base portion;

two element storage pockets separately formed in said base portion in such a manner that they are separately in communication with said light conductive tubes;

a light emitting element stored in one of said two element storage pockets for emitting light;

a light receiving element stored in the other of said two element storage pockets for receiving the light;

two reflecting mirrors respectively formed in end portions of said light conductive tubes for causing light passing through one of said light conductive tubes to be reflected into the other of said light conductive tubes.

11. The real sensor as set forth in claim 10, wherein said light emitting element emits visible rays, and said light receiving element receives the visible rays.

12. The reel sensor as set forth in claim 10, wherein said reel sensor is disposed within an electric appliance enclosed by a light shield plate.

13. The reel sensor as set forth in claim 12, wherein said reel sensor is disposed under a deck chassis of the electric appliance.

14. A reel sensor arranged to sense rotation of a reel in a video cassette recorder, said reel sensor being mounted on a printed circuit board in the video cassette recorder and including an optical path which crosses rotation loci of sensing projections of said reel, comprising:

a light conductive element including a base portion formed of a light intransmissible material and mounted on the printed circuit board and a pair of light conductive portions respectively formed of a light intransmissible material and erected on said base portion;

two element storage pockets separately formed in said base portion in such a manner that they respectively correspond to said light conductive portions;

a light emitting element stored in one of said two element storage pockets for emitting light;

a light receiving element stored in the other of said two element storage pockets for receiving the light;

two reflecting surfaces respectively formed in end portions of said light conductive portions for causing light passing through one of said light conductive tubes to be reflected into the other of said light conductive tubes.

15. The reel sensor as set forth in claim 14, wherein said light emitting element emits visible rays, and said light receiving element receives the visible rays.

16. The reel sensor as set forth in claim 14, wherein said reel sensor is disposed within an electric appliance enclosed by a light shield plate.

17. The reel sensor as set forth in claim 16, wherein said reel sensor is disposed under a deck chassis of the electric appliance.

* * * * *